(12) United States Patent  
Minoshima

(10) Patent No.: US 7,559,562 B2  
(45) Date of Patent: Jul. 14, 2009

(54) SUSPENSION APPARATUS FOR VEHICLE

(75) Inventor: Harumi Minoshima, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 461 days.

(21) Appl. No.: 11/444,486

(22) Filed: Jun. 1, 2006

(65) Prior Publication Data

US 2006/0279056 A1    Dec. 14, 2006

(30) Foreign Application Priority Data

Jun. 14, 2005    (JP) ............................ 2005-173773

(51) Int. Cl.
*B60G 21/05* (2006.01)
(52) U.S. Cl. ............................................. 280/124.106
(58) Field of Classification Search .......... 280/124.106, 280/124.107, 124.13, 124.133, 124.152, 280/124.158
See application file for complete search history.

(56) References Cited

U.S. PATENT DOCUMENTS 6,533,490 B2 *   3/2003   Kincaid et al. ............... 403/133

| | | | |
|---|---|---|---|
| 7,077,407 B2 * | 7/2006 | Shin | 280/124.107 |
| 2004/0173985 A1 * | 9/2004 | Bruhl et al. | 280/124.106 |
| 2005/0166750 A1 * | 8/2005 | Kesselgruber | 91/459 |

FOREIGN PATENT DOCUMENTS

| | | |
|---|---|---|
| DE | 10 2004 040 940 A1 | 3/2005 |
| DE | 10 2004 042 345 A1 | 3/2005 |
| JP | 5-201229 | 8/1993 |
| JP | 6-266834 | 10/1995 |
| JP | 7-257143 | 10/1995 |
| JP | 08127220 A * | 5/1996 |

* cited by examiner

*Primary Examiner*—Faye M. Fleming
(74) *Attorney, Agent, or Firm*—Oblon, Spivak, McClelland, Maier & Neustadt, P.C.

(57) ABSTRACT

A suspension apparatus for a vehicle includes a stabilizer bar and an oil-hydraulic cylinder for controlling the stiffness of the stabilizer bar. The stabilizer bar is mounted to the vehicle body to be rotatable about a first axis via a laterally extending torsion bar portion thereof. A left arm portion of the stabilizer bar connected to the oil-hydraulic cylinder includes first and second arm sections. The first arm section extends forward from the left end of the torsion bar portion. The second arm section, which extends in the fore-aft direction, is connected to the distal end of the first arm section via a rubber bushing to be rotatable about a second axis. The second arm section includes a rubber bushing provided at a portion through which the first axis passes. The oil-hydraulic cylinder is connected to the rubber bushing via a bracket.

11 Claims, 4 Drawing Sheets

FRONT OF VEHICLE

SUSPENSION APPARATUS FOR VEHICLE

BACKGROUND OF THE INVENTION

1. Field of the Invention

The present invention relates to a suspension apparatus for a vehicle (hereinafter referred to as a "vehicle suspension apparatus", and more particularly to a vehicle suspension apparatus which can control stiffness of a stabilizer bar.

2. Description of the Related Art

A conventional vehicle suspension apparatus of such a type includes a stabilizer bar and an oil-hydraulic cylinder. The stabilizer bar is mounted to the vehicle body at its torsion bar portion extending in the lateral direction of the vehicle in such a manner that the stabilizer bar can rotate about the axis of the torsion bar portion. The stabilizer bar has left and right arm portions extending from the left and right ends of the torsion bar portion in the fore-aft direction of the vehicle, and is connected to left and right wheel support members at distal ends of the respective arm portions. The oil-hydraulic cylinder is interposed between one of the arm portions and the vehicle body. Extension and contraction of the oil-hydraulic cylinder is controlled so as to control the stiffness of the stabilizer bar. Such a conventional vehicle suspension apparatus is disclosed in Japanese Patent Application Laid-Open (kokai) No. H5-201229.

In the vehicle suspension apparatus disclosed in the publication, a stabilizer bar includes a torsion bar portion extending in the lateral direction of the vehicle, and left and right arm portions extending from the left and right ends of the torsion bar portion toward the rear of the vehicle. One arm portion is connected at its distal end to one strut (wheel support member) via a stabilizer link, and the other arm is connected at its distal end to the other strut via an oil-hydraulic cylinder. The oil-hydraulic cylinder is disposed away from the torsion bar portion of the stabilizer bar and in the vicinity of the corresponding strut.

In the vehicle suspension apparatus disclosed in the publication, when the left and right wheels move vertically in the same direction (in the same phase) with extension and contraction of the oil-hydraulic cylinder being prohibited, the two arm portions and the torsion bar portion rotate together about the axis of the torsion bar portion. Therefore, in this case, the torsion bar portion is not twisted, and the stiffness of the stabilizer bar is maintained at a low level. When the left and right wheels move vertically in opposite directions (in opposite phases) with extension and contraction of the oil-hydraulic cylinder being prohibited, the two arm portions rotate in opposite directions about the axis of the torsion bar portion. Therefore, in this case, the torsion bar portion is twisted, and the stiffness of the stabilizer bar is changed to a high level.

Meanwhile, when the left and right wheels move vertically in the same phase with extension and contraction of the oil-hydraulic cylinder being permitted, as in the case where extension and contraction of the oil-hydraulic cylinder are prohibited, the torsion bar portion is not twisted, and the stiffness of the stabilizer bar is maintained at the low level. When the left and right wheels move vertically in opposite phases with extension and contraction of the oil-hydraulic cylinder being permitted, unlike the case where extension and contraction of the oil-hydraulic cylinder are prohibited, the torsion bar portion is not twisted, because the oil-hydraulic cylinder is extendable and contactable, and the stiffness of the stabilizer bar is maintained at the low level.

Incidentally, in the vehicle suspension apparatus disclosed in the publication, of the two arm portions of the stabilizer bar, one arm portion moves to follow the corresponding strut and the oil-hydraulic cylinder. Therefore, when the left and right wheels move vertically, input load always acts on the oil-hydraulic cylinder in the direction of extension and contraction, which brings about a problem of difficulty in securing durability of the oil-hydraulic cylinder.

SUMMARY OF THE INVENTION

In view of the foregoing, an object of the present invention is to provide a vehicle suspension apparatus which prevents load from acting on a hydraulic cylinder when left and right wheels move vertically in the same phase to thereby improve the durability of the hydraulic cylinder.

In order to achieve the above object, the present invention provides a vehicle suspension apparatus comprising a stabilizer bar and a hydraulic cylinder. The stabilizer bar includes a torsion bar portion extending in the lateral direction of the vehicle, and left and right arm portions extending from left and right ends of the torsion bar portion in the fore-aft direction of the vehicle. The stabilizer bar is mounted at the torsion bar portion to a body of the vehicle such that the stabilizer bar can rotate about an axis of the torsion bar portion, and distal ends of the arm portions are connected to corresponding wheel support members. The hydraulic cylinder is interposed between one of the arm portions and the vehicle body, extension and contraction of the hydraulic cylinder being controlled so as to control the stiffness of the stabilizer bar. The arm portion connected to the hydraulic cylinder includes a first arm section extending from one end of the torsion bar portion toward the front or rear of the vehicle and having a distal end offset from the axis of the torsion bar portion in the fore-aft direction of the vehicle, and a second arm section connected to the distal end of the first arm section to be rotatable about an axis parallel to the axis of the torsion bar portion. The second arm section extends in the fore-aft direction of the vehicle, and is connected to the corresponding wheel support member at a portion of the second arm section through which the axes do not pass. The connection portion for connection with the hydraulic cylinder is provided on the second arm at a portion through which the axis of the torsion bar portion passes.

In the vehicle suspension apparatus, for example, when the left and right wheels move vertically in the same phase with extension and contraction of the hydraulic cylinder being prohibited, the first and second arm sections of one arm portion connected to the hydraulic cylinder, the other arm portion, and the torsion bar portion rotate together about the axis of the torsion bar portion. Accordingly, in this case, the torsion bar portion is not twisted, and the stiffness of the stabilizer bar is maintained at a low level. When the left and right wheels move vertically in opposite phases with extension and contraction of the hydraulic cylinder being prohibited, the second arm section rotates about the axis of the torsion bar portion in the direction opposite to the rotational direction of the first arm section. Accordingly, in this case, the torsion bar portion is twisted, and the stiffness of the stabilizer bar is changed to a high level.

Meanwhile, when the left and right wheels move vertically in the same phase with extension and contraction of the hydraulic cylinder being permitted, as in the case where the extension and contraction of the hydraulic cylinder are prohibited, the torsion bar portion is not twisted, and the stiffness of the stabilizer bar is maintained at a low level. Meanwhile, when the left and right wheels move vertically in opposite phases with extension and contraction of the hydraulic cylinder being permitted, the second arm section rotates in relation to the first arm section about the axis parallel to the axis of the torsion bar portion at a connection position at which the second arm section is connected with the first arm section, while extending or contracting the hydraulic cylinder via the connection portion. Accordingly, in this case, the torsion bar portion is not twisted, and the stiffness of the stabilizer bar is maintained at a low level.

In the vehicle suspension apparatus, the connection portion for connection with the hydraulic cylinder is provided on the second arm section at a portion through which the axis of the torsion bar portion passes. Therefore, the second arm section rotates about the axis of the torsion bar portion in relation to the hydraulic cylinder in both the case where the left and right wheels move vertically in the same phase with extension and contraction of the hydraulic cylinder being prohibited and where the left and right wheels move vertically in the same phase with extension and contraction of the hydraulic cylinder being permitted. Therefore, when the left and right wheels move vertically in the same phase, no input load directed in the direction of extension and contraction acts on the hydraulic cylinder. Accordingly, the hydraulic cylinder has enhanced durability.

Since the arm portion connected to the hydraulic cylinder includes the first and second arm sections, and the connection portion for connection with the hydraulic cylinder is provided on the second arm section, the hydraulic cylinder can be disposed at a position where a sufficiently large space can be secured.

When the present invention is embodied, the second arm section may be positioned with respect to the lateral direction of the vehicle by positioning means, and a connection member connected to the second arm section may be connected to the corresponding wheel support member via a ball joint. In this case, the positioning member may include a bushing which is composed of an inner sleeve, an outer sleeve, and an elastic member interposed therebetween and which is disposed such that its center axis extends in the lateral direction of the vehicle, with one of the inner and outer sleeves being connected to the second arm section and the other being connected to the connection member. Alternatively, the positioning member may include a link which is provided separately from the connection member and extends in the lateral direction of the vehicle, with one end of the link being connected to the second arm section and the other end of the link being connected to the vehicle body.

In this case, the second arm section is positioned with respect to the lateral direction of the vehicle by the positioning means. Therefore, for example, when the left and right wheels move vertically in opposite phases with extension and contraction of the hydraulic cylinder being prohibited, a large load generated by the twisted torsion bar portion is transmitted to the second arm section. However, the configuration described above prevents movement of the second arm section in the lateral direction of the vehicle, which movement would otherwise occur due to the load. As a result, inclination, in the lateral direction of the vehicle, of the connection member which connects the second arm section and the wheel support member is prevented, and excessive load is prevented from acting on the connection member. Moreover, inclination of the connection member in the lateral direction of the vehicle is prevented even if the second arm section, the hydraulic cylinder, and the connection member are not provided in a common vertical plane. Therefore, the degree of freedom in disposing the second arm section, the hydraulic cylinder, and the connection member can be increased.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
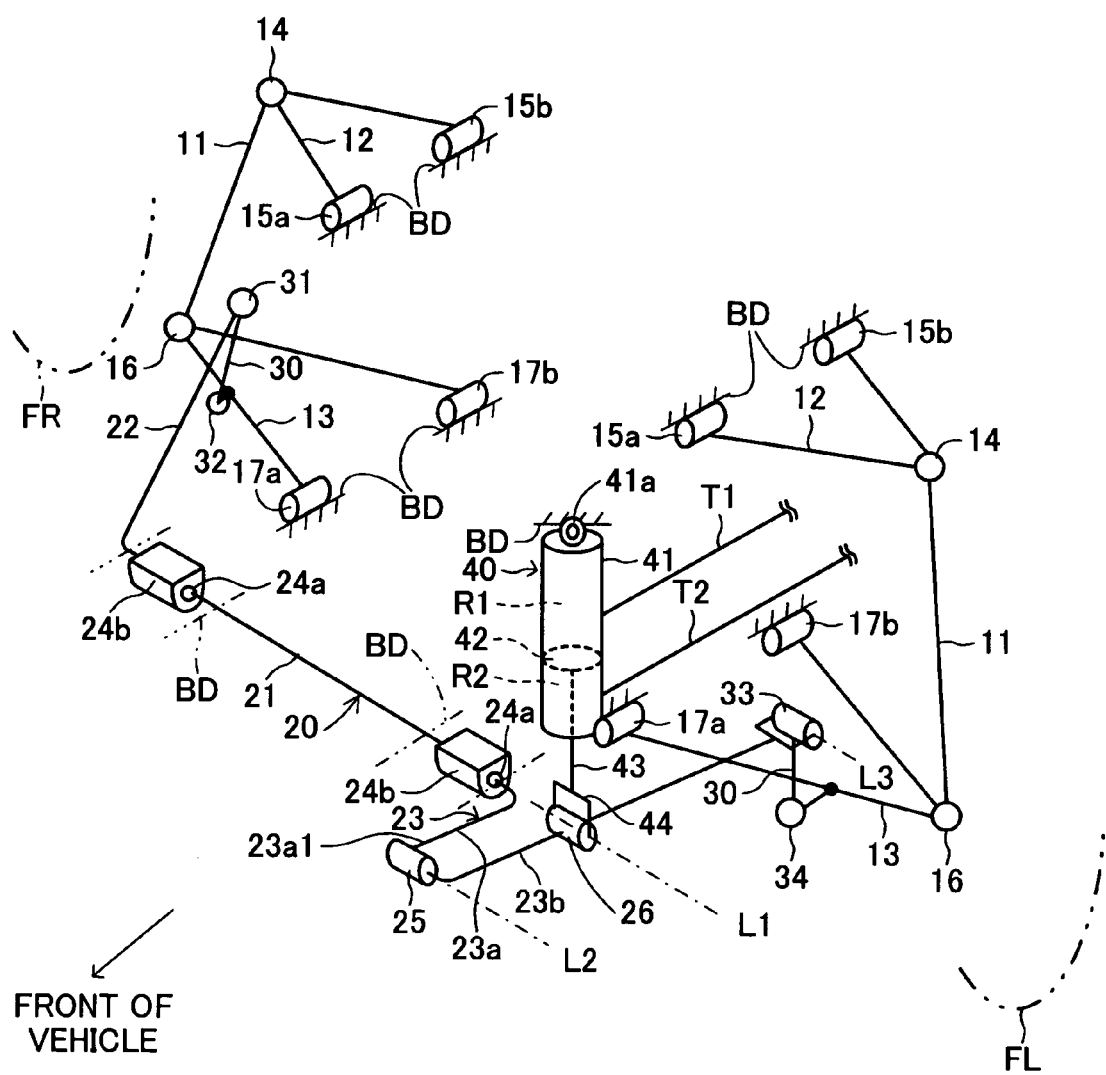
FIG. 1 is a schematic diagram showing a front wheel side of a vehicle suspension apparatus according to one embodiment of the present invention.
Figure 2:
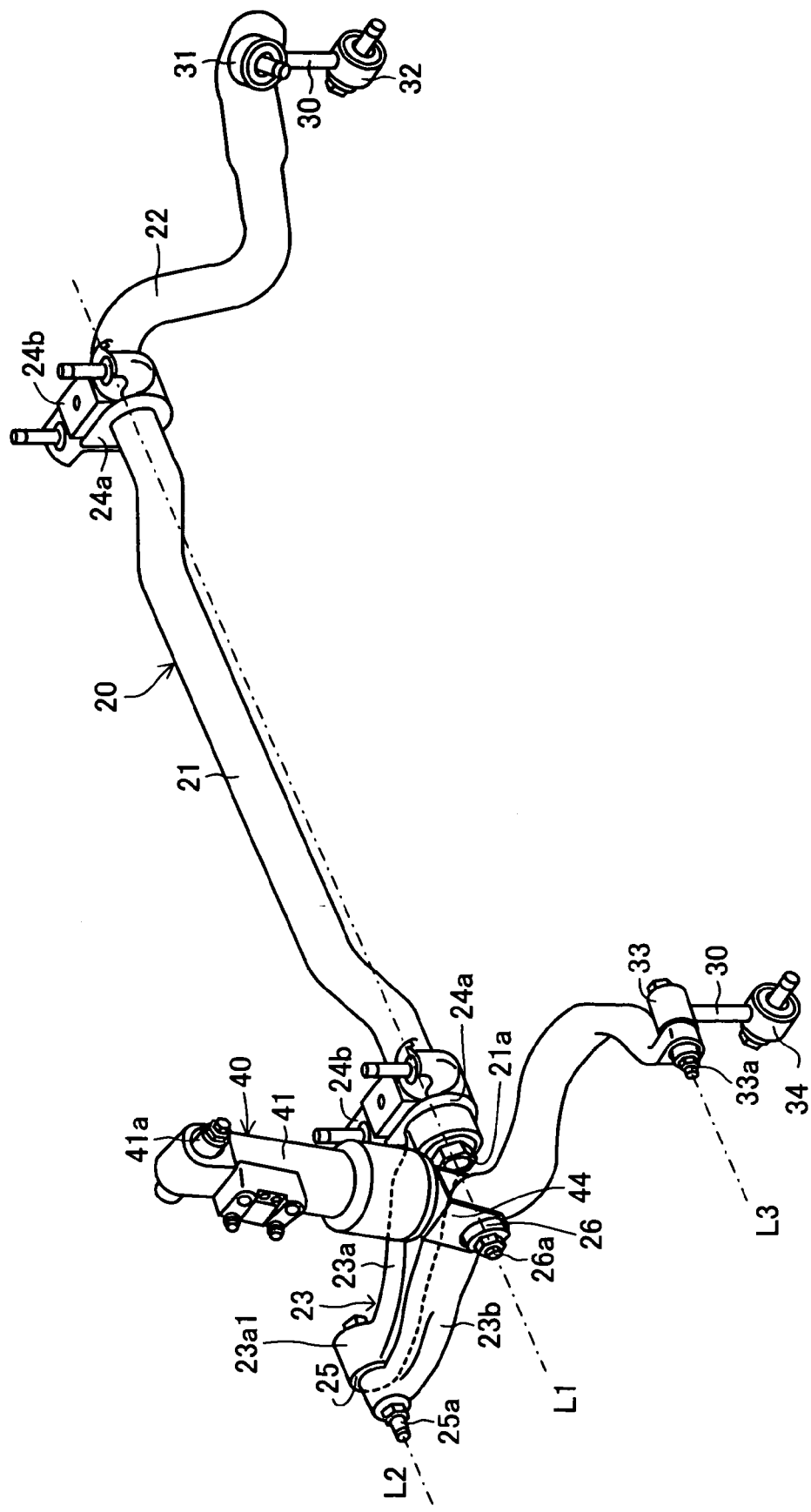
FIG. 2 is an enlarged perspective view of a main portion of the vehicle suspension apparatus shown in FIG. 1.

One embodiment of the present invention will be described with reference to the drawings. FIGS. 1 and 2 schematically show a front wheel side of a vehicle suspension apparatus according to the embodiment of the present invention. The vehicle suspension apparatus includes left and right wheel support members each composed of a knuckle 11, an A-shaped upper arm 12, an A-shaped lower arm 13, etc.; a stabilizer bar 20, left and right stabilizer links 30; and an oil-hydraulic cylinder (hydraulic cylinder) 40. In the present embodiment, since the rear wheel side is configured in the same manner as the front wheel side, only the front wheel side will be described, and a description for the rear wheel side is omitted.

The left and right knuckles 11 rotatably support left and right wheels FL and FR, respectively, and are connected to a vehicle body BD via the left and right upper arms 12 and the left and right lower arms 13. The left and right upper arms 12, which extend outboard in the lateral direction of the vehicle, are connected at their outer ends to the upper ends of the respective knuckles 11 via respective ball joints 14, and are connected at their inner ends to respective suspension members, which are portions of the vehicle body BD, via respective rubber bushings 15a and 15b. The left and right lower arms 13, which extend outboard in the lateral direction of the vehicle, are connected at their outer ends to the lower ends of the respective knuckles 11 via respective ball joints 16, and are connected at their inner ends to the respective suspension members, which are portions of the vehicle body BD, via respective rubber bushings 17a and 17b.

The stabilizer bar 20 includes a torsion bar portion 21, a right arm portion 22, and a left arm portion 23. The torsion bar portion 21 extends in the lateral direction of the vehicle, and is mounted at the vicinities of the left and right ends to the lower surface of a frame, which is a portion of the vehicle body BD, via rubber bushings 24a and brackets 24b in such a manner that the torsion bar portion 21 can rotate about an axis L1. The right arm portion 22 extends from the right end of the torsion bar portion 21 in the aft direction of the vehicle, and is connected at its rear end to the right lower arm 13 via the right stabilizer link 30.

The left arm portion 23 includes a first arm section 23a and a second arm section 23b. The first arm section 23a is connected to the left end of the torsion bar portion 21 by means of a bolt 21a, and extends in the fore direction of the vehicle (see FIG. 2). A distal end 23a1 of the first arm section 23a is offset from the axis L1 of the torsion bar portion 21 toward the front of the vehicle, and a rubber bushing 25 is press-fit into the distal end 23a1. The rubber bushing 25 is disposed in an orientation such that its center axis L2 becomes parallel to the axis L1 of the torsion bar portion 21.

The second arm section 23b extends in the fore-aft direction of the vehicle, and is connected to the distal end 23a 1 of the first arm section 23a via the rubber bushing 25 and a bolt 25a such that the second arm section 23b can rotate about the center axis L2. At a rear end offset from the axis L1 and the center axis L2 toward the rear of the vehicle, the second arm section 23b is connected to the left lower arm 13 via the left stabilizer link 30. A rubber bushing 26 is press-fitted into an intermediate portion of the second arm section 23b. The rubber bushing 26 is disposed coaxially with the axis L1 of the torsion bar portion 21 at a portion of the second arm section 23b through which the axis L1 passes.

The right stabilizer link 30 is connected at its upper end to the rear end of the right arm portion 22 via a ball joint 31, and is connected at its lower end to a front arm portion of the right lower arm 13 via a ball joint 32. The left stabilizer link 30, which functions as a connection member, is connected at its upper end to the rear end of the second arm section 23b via a rubber bushing 33, and is connected at its lower end to a front arm portion of the left lower arm 13 via a ball joint 34.

The rubber bushing 33 has a known structure including an inner sleeve, an outer sleeve, and a rubber (elastic member) interposed therebetween, and is disposed such that its center axis L3 extends in the lateral direction of the vehicle. The inner sleeve of the rubber bushing 33 is connected to the second arm section 23b with its end face in contact with the rear end of the second arm section 23b. The outer sleeve of the rubber bushing 33 is secured to the upper end of the stabilizer link 30 at its outer periphery. The rubber bushing 33 and the bolt 33a serve as a positioning means for positioning the second arm section 23b in the lateral direction of the vehicle.

The oil-hydraulic cylinder 40 is interposed between the left arm portion 23 and the vehicle body BD. The oil-hydraulic cylinder 40 includes a housing 41, a piston 42, and a piston rod 43. The oil-hydraulic cylinder 40 is connected, at the top wall of the housing 41, to the vehicle body BD via a rubber bushing 41a in such a manner that the oil-hydraulic cylinder 40 can rotate about an axis extending in the fore-aft direction of the vehicle. The piston 42 is fluid-tightly and slidably assembled into the housing 41, and divides the interior of the housing 41 into an upper chamber R1 and a lower chamber R2. The upper and lower chambers R1 and R2 of the oil-hydraulic cylinder 40 are connected to the upper and lower chambers of a rear-wheel-side oil-hydraulic cylinder via passages T1 and T2 and an unillustrated hydraulic control circuit.

The upper end of the piston rod 43 is secured to the lower end of the piston 42, and fluid-tightly projects from the bottom wall of the housing 41. The lower end of the piston rod 43 is connected to the rubber bushing 26 of the second arm section 23b via a bracket 44. The bracket 44 generally assumes an inverted U-like shape as viewed from the rear, and is connected to the rubber bushing 26 by means of a bolt 26a to be rotatable about the axis L1. The rubber bushing 26 and the bolt 26a function as a connection portion.

In the present embodiment configured as described above, when the left and right wheels FL and FR move vertically in the same phase with extension and contraction of the oil-hydraulic cylinder 40 being prohibited, the first and second arm sections 23a and 23b of the left arm portion 23, the right arm portion 22, and the torsion bar portion 21 rotate together about the axis L1. Accordingly, the torsion bar portion 21 is not twisted, and the stiffness of the stabilizer bar 20 is maintained at a low level.

When the left and right wheels FL and FR move vertically in opposite phases with extension and contraction of the oil-hydraulic cylinder 40 being prohibited, the second arm section 23b of the left arm portion 23 rotates about the axis L1 of the torsion bar portion 21 in the direction opposite to the rotational direction of the first arm section 23a. Accordingly, in this case, the torsion bar portion 21 is twisted, and the stiffness of the stabilizer bar 20 is changed to a high level. Notably, even when only one of the left and right wheels FL and FR moves vertically with extension and contraction of the oil-hydraulic cylinder 40 being prohibited, the stiffness of the stabilizer bar 20 is changed to a high level as in the above-described case.

Meanwhile, when the left and right wheels FL and FR move vertically in the same phase with extension and contraction of the oil-hydraulic cylinder 40 being permitted, as in the case where extension and contraction of the oil-hydraulic cylinder 40 are prohibited, the torsion bar portion 21 is not twisted, and the stiffness of the stabilizer bar 20 is maintained at a low level.

Further, when the left and right wheels FL and FR move vertically in opposite phases with extension and contraction of the oil-hydraulic cylinder 40 being permitted, the second arm section 23b of the left arm portion 23 rotates in relation to the first arm section 23a about the center axis L2 of the rubber bushing 25, at which the second arm section 23b is connected to the first arm 23a, while extending or contracting the piston rod 43 of the oil-hydraulic cylinder 40 via the rubber bushing 26, the bolt 26a, and the bracket 44. Accordingly, in this case, the torsion bar portion 21 is not twisted, and the stiffness of the stabilizer bar 20 is maintained at a low level. Notably, even when only one of the left and right wheels FL and FR moves vertically with extension and contraction of the oil-hydraulic cylinder 40 being permitted, the stiffness of the stabilizer bar 20 is maintained at a low level as in the above-described case.

In the present embodiment, the rubber bushing 26 and the bolt 26a are disposed coaxially with the axis L1 of the torsion bar portion 21 at a portion of the second arm section 23b through which the axis L1 passes. Therefore, the second arm section 23b rotates about the axis L1 in relation to the piston rod 43 of the oil-hydraulic cylinder 40 in both the case where the left and right wheels FL and FR move vertically in the same phase with extension and contraction of the oil-hydraulic cylinder 40 being prohibited and where the left and right wheels FL and FR move vertically in same phase with extension and contraction of the oil-hydraulic cylinder 40 being permitted. Therefore, when the left and right wheels FL and FR move vertically in the same phase, no input load directed in the direction of extension and contraction acts on the oil-hydraulic cylinder 40. Accordingly, the oil-hydraulic cylinder 40 has enhanced durability.

In the above-described embodiment, the left arm portion 23 of the stabilizer bar 20 includes the first and second arm sections 23a and 23b, and the rubber bushing 26 is provided on the second arm section 23b. Therefore, the oil-hydraulic cylinder 40 can be disposed at a position where a sufficiently large space can be secured.

In the above-described embodiment, the second arm section 23b is positioned with respect to the lateral direction of the vehicle by means of the rubber bushing 33 and the bolt 33a. Accordingly, for example, when the left and right wheels FL and FR move vertically in opposite phases with extension and contraction of the oil-hydraulic cylinder 40 being prohibited, a large load generated by the twisted torsion bar portion 21 is transmitted to the second arm section 23b. However, the configuration described above prevents movement of the second arm section 23b in the lateral direction of the vehicle, which movement would otherwise occur due to the load.

As a result, inclination, in the lateral direction of the vehicle, of the left stabilizer link 30, which connects the second arm section 23b and the left lower arm 13, is prevented, and excessive load is prevented from acting on the left stabilizer link 30. Moreover, inclination of the left stabilizer link 30 in the lateral direction of the vehicle is prevented even if the second arm section 23b, the oil-hydraulic cylinder 40, and the left stabilizer link 30 are not provided in a common vertical plane. Therefore, the degree of freedom in disposing the second arm section 23b, the oil-hydraulic cylinder 40, and the left stabilizer link 30 can be increased.

Figure 3:
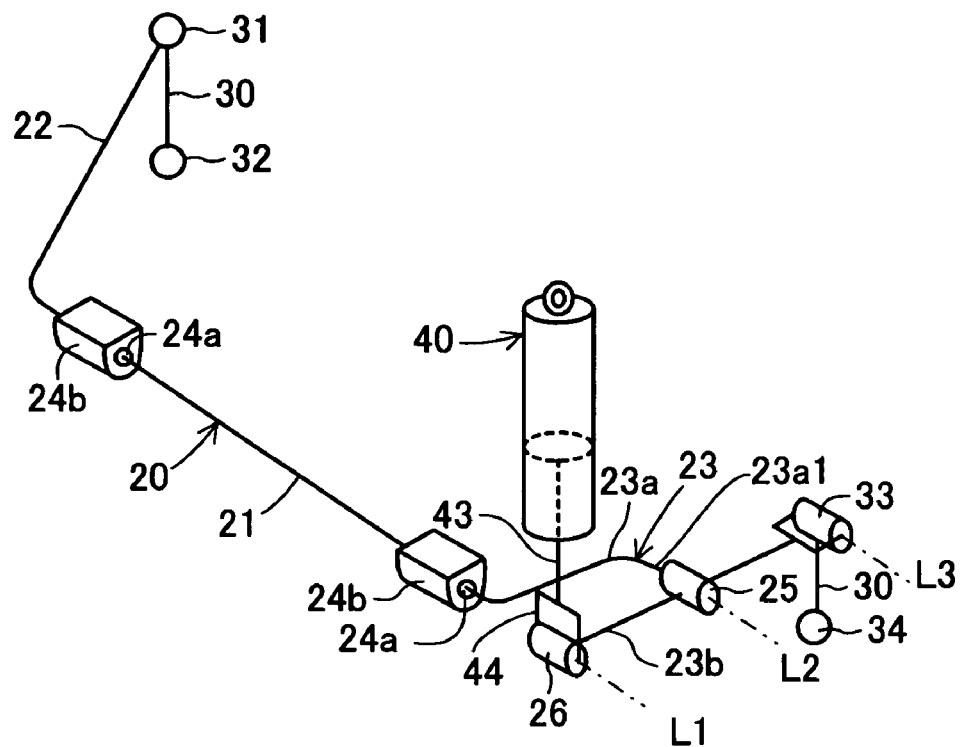
FIG. 3 is a schematic diagram showing a front wheel side of a vehicle suspension apparatus according to a first modification of the embodiment.

In the above-described embodiment, the first arm section 23a of the left arm portion 23 extends toward the front of the vehicle, and the second arm 23b is connected to the distal end 23a1 of the first arm section 23a, which is offset from the axis L1 of the torsion bar portion 21 toward the front of the vehicle, such that the second arm section 23b can rotate about the center axis L2 of the rubber bushing 25. However, as schematically shown in FIG. 3, the embodiment may be modified in such a manner that the first arm section 23a extends toward the rear of the vehicle, and the second arm 23b is connected to the distal end 23a1 of the first arm section 23a, which is offset from the axis L1 of the torsion bar portion 21 toward the rear of the vehicle, such that the second arm section 23b can rotate about the center axis L2 of the rubber bushing 25. Notably, in this case, extension and contraction of the oil-hydraulic cylinder 40 due to rotation of the second arm section 23b about the center axis L2 occur in the reverse manner as compared to the above-described embodiment. This first modification of the embodiment provides effects similar to those attained by the embodiment, such as improved durability of the oil-hydraulic cylinder 40 and prevention of excessive load on the left stabilizer link 30.

Figure 4:
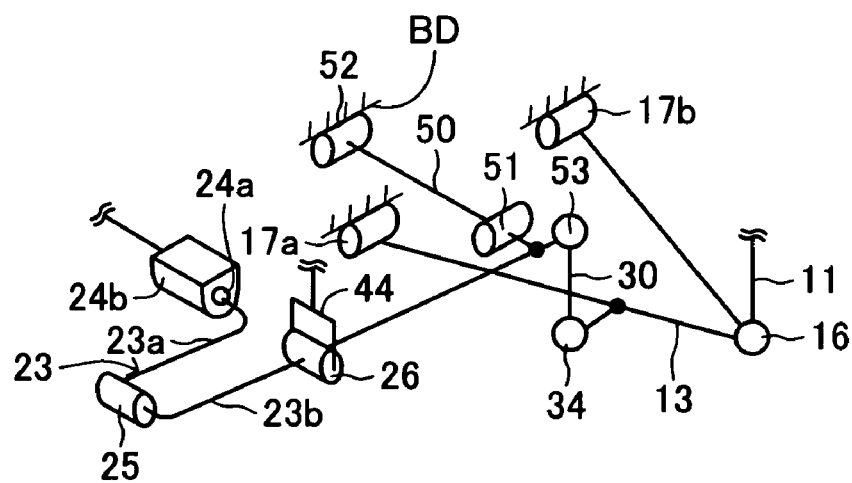
FIG. 4 is a schematic diagram showing a front wheel side of a vehicle suspension apparatus according to a second modification of the embodiment.

In the above-described embodiment and the first modification thereof, the second arm 23b is positioned with respect to the lateral direction of the vehicle by use of the rubber bushing 33 and the bolt 33a. However, as schematically shown in FIG. 4, the second arm 23b may be positioned with respect to the lateral direction of the vehicle by use of a link 50.

The link 50 is a member separate from the left stabilizer link 30, and extends in the lateral direction of the vehicle. The link 50 is connected at its outer end to the second arm section 23b in the vicinity of its rear end via a rubber bushing 51, and is connected at its inner end to the vehicle body BD via a rubber bushing 52. Notably, in this second modification, the second arm 23b can be connected to the left stabilizer link 30 by use of a ball joint 53. This second modification provides effects similar to those attained by the above-described embodiment, such as improved durability of the oil-hydraulic cylinder 40 and prevention of excessive load on the left stabilizer link 30.

Figure 5:
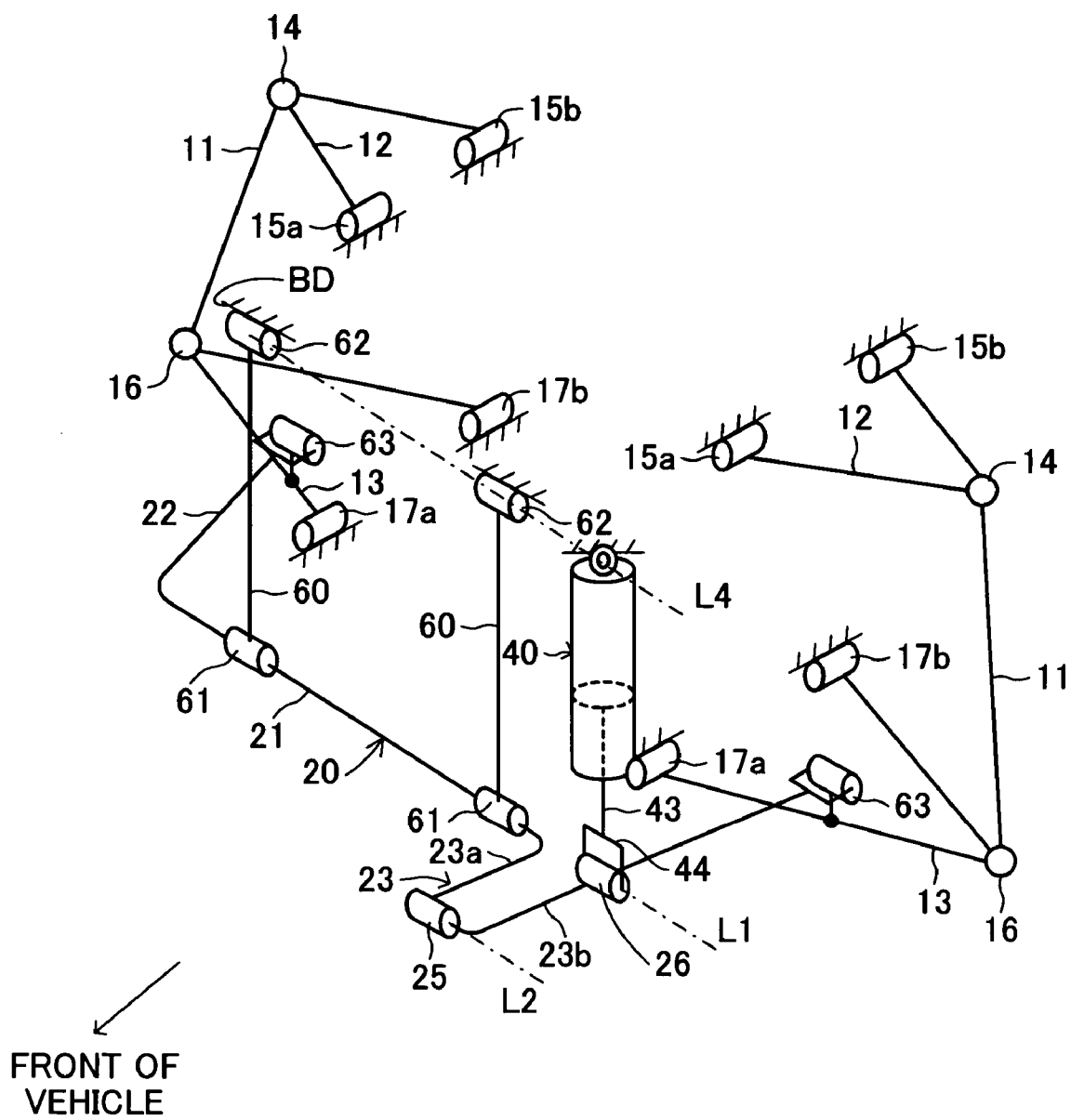
FIG. 5 is a schematic diagram showing a front wheel side of a vehicle suspension apparatus according to a third modification of the embodiment.

In the above-described embodiment and the modifications thereof, the right arm portion 22 and the second arm section 23b of the left arm portion 23 are connected to the corresponding lower arms 13 via the right and left stabilizer links 30, respectively. However, as schematically shown in FIG. 5, in place of the right and left stabilizer links 30, right and left stabilizer links 60 may be provided on the torsion bar portion 21 side.

The right and left stabilizer links 60 support at their lower ends the torsion bar portion 21 via rubber bushings 61 in such a manner that the torsion bar portion 21 is rotatable about the axis L1, and are connected at their lower upper ends to the vehicle body BD via the rubber bushings 62 in such a manner that the stabilizer links 60 can rotate about a center axis L4. The upper ends of the stabilizer links 60 are at substantially the same height as the upper end of the oil-hydraulic cylinder 40. The right arm portion 22 and the second arm section 23b are connected to the corresponding lower arms 13 via rubber bushings 63. This third modification provides effects similar to those attained by the above-described embodiment, such as improved durability of the oil-hydraulic cylinder 40.

In the above-described embodiment and modifications thereof, the present invention is applied to a vehicle having a double-wishbone-type suspension system. However, the present invention is not limited thereto, and may be applied to various vehicles such as a vehicle having a strut-type suspension system.

What is claimed is:

1. A suspension apparatus for a vehicle, comprising:
   a stabilizer bar including:
      a torsion bar portion that extends in a lateral direction of the vehicle, and
      left and right arm portions that respectively extend in a fore-aft direction of the vehicle from left and right ends of the torsion bar portion,
      wherein the torsion bar portion is mounted to a body of the vehicle such that the stabilizer bar can rotate about an axis of the torsion bar portion, and distal ends of the arm portions are connected to corresponding wheel support members; and
   a hydraulic cylinder interposed between one of the left and right arm portions and the body of the vehicle such that extension and contraction of the hydraulic cylinder are controlled so as to control a stiffness of the stabilizer bar,
   wherein the one of the left and right arm portions connected to the hydraulic cylinder includes:
      a first arm section that extends from one end of the torsion bar portion in the fore-aft direction of the vehicle such that a distal end of the first arm section is offset from the axis of the torsion bar portion in the fore-aft direction of the vehicle, and
      a second arm section that is rotatably connected to the distal end of the first arm section about an axis parallel to the axis of the torsion bar portion, the second arm section extends in the fore-aft direction of the vehicle and connects to the corresponding wheel support member at a portion of the second arm section through which neither of the respective axes pass, and
   a connection portion that connects the hydraulic cylinder to the second arm section at a portion through which the axis of the torsion bar portion passes.

2. The suspension apparatus for a vehicle according to claim 1, further comprising a connection member,
   wherein the second arm section is positioned with respect to the lateral direction of the vehicle by a positioning member, and the connection member is disposed between the second arm section and the corresponding wheel support member via a ball joint.

3. The suspension apparatus for a vehicle according to claim 2, wherein the positioning member includes a bushing which includes an inner sleeve, an outer sleeve, and an elastic member interposed therebetween, wherein the bushing is disposed such that a bushing center axis extends in the lateral direction of the vehicle; and one of the inner and outer sleeves is connected to the second arm section and the other of the inner and outer sleeves is connected to the connection member.

4. The suspension apparatus for a vehicle according to claim 2, wherein the positioning member includes a link which is provided separately from the connection member and extends in the lateral direction of the vehicle; and one end of the link is connected to the second arm section and the other end of the link is connected to the vehicle body.

5. A suspension apparatus for a vehicle, comprising:
a stabilizer bar including a torsion bar portion extending in the lateral direction of the vehicle, and left and right arm portions extending from left and right ends of the torsion bar portion in the fore-aft direction of the vehicle, the stabilizer bar being mounted at the torsion bar portion to a body of the vehicle such that the stabilizer bar can rotate about an axis of the torsion bar portion, and distal ends of the arm portions being connected to corresponding wheel support members; and
a hydraulic cylinder interposed between one of the arm portions and the vehicle body, extension and contraction of the hydraulic cylinder being controlled so as to control the stiffness of the stabilizer bar, wherein
the arm portion connected to the hydraulic cylinder includes a first arm section extending from one end of the torsion bar portion toward the front or rear of the vehicle and having a distal end offset from the axis of the torsion bar portion in the fore-aft direction of the vehicle, and a second arm section connected to the distal end of the first arm section to be rotatable about an axis parallel to the axis of the torsion bar portion, the second arm section extending in the fore-aft direction of the vehicle and being connected to the corresponding wheel support member at a portion of the second arm section through which the axes do not pass,
a connection portion for connection with the hydraulic cylinder is provided on the second arm at a portion through which the axis of the torsion bar portion passes,
the second arm section is positioned with respect to the lateral direction of the vehicle by positioning means, and
a connection member connected to the second arm section is connected to the corresponding wheel support member via a ball joint.

6. The suspension apparatus for a vehicle according to claim 5, wherein the positioning member includes a bushing which is composed of an inner sleeve, an outer sleeve, and an elastic member interposed therebetween and which is disposed such that its center axis extends in the lateral direction of the vehicle; and one of the inner and outer sleeves is connected to the second arm section and the other of the inner and outer sleeves is connected to the connection member.

7. The suspension apparatus for a vehicle according to claim 5, wherein the positioning member includes a link which is provided separately from the connection member and extends in the lateral direction of the vehicle; and one end of the link is connected to the second arm section and the other end of the link is connected to the vehicle body.

8. A suspension apparatus for a vehicle, comprising:
stabilizer bar including a torsion bar portion that extends in a lateral direction of the vehicle, and first and second arm portions that are interposed respectively in a fore-aft direction between ends of the torsion bar portion and first and second wheel support members; and
a hydraulic cylinder interposed between the first arm portion and the vehicle body,
wherein an extension and a contraction of the hydraulic cylinder is controllable such that a stiffness of the stabilizer bar is determined,
wherein the torsion bar portion is configured to mount to a body of the vehicle such that the stabilizer bar can rotate about an axis of the torsion bar portion; and
wherein the first arm portion includes,
a fixed section that extends in the fore-aft direction from the end of the torsion bar portion of the vehicle such that a distal end of the fixed section is offset from the axis of the torsion bar portion in the fore-aft direction of the vehicle, and
a rotatable section that is rotatably connected to the distal end of the fixed section about an axis parallel to the axis of the torsion bar portion, the rotatable section extends in the fore-aft direction of the vehicle and connects to the first wheel support member at a portion of the rotatable section through which neither respective axes pass,
wherein the rotatable section includes an attachment portion located where the axis of the torsion bar passes through the rotatable section, that attaches the hydraulic cylinder to the rotatable section.

9. The suspension apparatus for a vehicle according to claim 8, further comprising a connection member,
wherein the rotatable section is positioned in the lateral direction of the vehicle by a positioning member, and the connection member is disposed between the rotatable section and the first wheel support member via a ball joint.

10. The suspension apparatus for a vehicle according to claim 9, wherein the positioning member includes a bushing which includes an inner sleeve, an outer sleeve, and an elastic member interposed therebetween,
wherein a bushing center axis extends in the lateral direction of the vehicle; and one of the inner and outer sleeves is connected to the rotatable section and the other of the inner and outer sleeves is connected to the connection member.

11. The suspension apparatus for a vehicle according to claim 9, wherein the positioning member includes a link which is provided separately from the connection member and extends in the lateral direction of the vehicle; and one end of the link is connected to the rotatable section and the other end of the link is connected to the vehicle body.

* * * * *